United States Patent [19]

Neukermans et al.

[11] Patent Number: 5,488,862
[45] Date of Patent: Feb. 6, 1996

[54] MONOLITHIC SILICON RATE-GYRO WITH INTEGRATED SENSORS

[75] Inventors: Armand P. Neukermans, 3510 Arbutus Ave., Palo Alto, Calif. 94303; Timothy G. Slater, San Francisco, Calif.

[73] Assignees: Armand P. Neukermans; D.B.A. Adagio, both of Palo Alto, Calif.

[21] Appl. No.: 208,424

[22] Filed: Mar. 8, 1994

Related U.S. Application Data

[63] Continuation-in-part of Ser. No. 139,397, Oct. 18, 1993.
[51] Int. Cl.$^6$ .............................. G01P 9/04; G01P 15/02
[52] U.S. Cl. ................................... 73/504.02; 73/504.12
[58] Field of Search ........................... 73/505, 510, 504, 73/517 R, 517 AV, 514, 778, 814; 357/25, 26

[56] References Cited

U.S. PATENT DOCUMENTS

| | | | |
|---|---|---|---|
| 4,598,585 | 7/1986 | Boxenhorn | 73/505 |
| 4,670,092 | 6/1987 | Motamedi | 156/643 |
| 4,699,006 | 10/1987 | Boxenhorn | 73/517 AV |
| 5,016,072 | 5/1991 | Greiff | 357/26 |
| 5,203,208 | 4/1993 | Bernstein | 73/505 |

OTHER PUBLICATIONS

Pfann, W. G. et al., "Semiconducting Stress Transducers Utilizing the Transverse and Shear Piezoresistance Effects", *Journal of Applied Physics*, vol. 32, No. 10, Oct. 1961, pp. 2008–2016.

Diem, B. et al., "SOI (SIMOX) as a Substrate for Surface Micromachining of Single Crystalline Silicon Sensors and Actuators", The 7th International Conference on Solid–State Sensors and Actuators, pp. 233–236.

Boxenhorn and Greiff, "Monolithic Silicon Accelerometer", *Sensors and Actuators*, A21–A23 (1990) 273–277.

*Primary Examiner*—Hezron E. Williams
*Assistant Examiner*—Helen C. Kwok
*Attorney, Agent, or Firm*—Schneck & McHugh

[57] ABSTRACT

A monolithic single crystal Si rate-gyro consisting of in the preferred embodiment, an outer torsional frame, self resonating with a substantial amplitude, as controlled by a four-terminal piezo torsion sensor, connected to an inner frame by torsional hinges. The inner frame itself is connected to a fixed inner post, by a set of torsion hinges, defining an axis of rotation perpendicular to the first axis. Rotation of the axis of oscillation of the outer body causes the moving mass and the inner frame to tilt and oscillate at the outer frequency due to Coriolis forces, thereby periodically deforming the inner hinges in torsion. These inner hinges are likewise equipped with a four-terminal piezo voltage torsion sensor, giving an indication of the rate of rotation of the sensor. The design allows for good sensitivity, due to the substantial swing of the outer oscillator, its high moment of inertia, excellent Si spring characteristics, and excellent sensitivity of the torsional sensors. Because of the integration of all of parts in silicon and its inherent simplicity, it can be made very inexpensively.

10 Claims, 6 Drawing Sheets

MONOLITHIC SILICON RATE-GYRO WITH INTEGRATED SENSORS

CROSS REFERENCE TO RELATED APPLICATION

This application is a continuation-in-part of prior application Ser. No. 08/139,397, filed Oct. 18, 1993.

TECHNICAL FIELD

The invention relates to gyroscopes and accelerometers and, in particular, to micromachined gyroscopes and accelerometers.

BACKGROUND ART

Vibratory gyroscopes provide a measure of the rate of rotation by sensing the effects of a Coriolis force on an oscillating body. Such sensors are very interesting for a number of applications. Though lacking the precision of the rotary gyros, their price makes them attractive for many applications. One example is the automotive brake control system, where the rate of rotation of the car needs to be sensed and controlled to avoid spin. Prices of many vibratory solid state gyros, using either quartz or piezo-electric materials are at present in the $500 to $1500 range.

This price is excessive for many potential mass applications such as automotive brake systems, robotic control, patient monitoring, virtual reality simulation, video games etc. These uses need another one or two orders of magnitude in price reduction to make the product viable and require semiconductor fabrication techniques to achieve this price performance ratio.

Micromachined rate gyro sensors have been made in the past. U.S. Pat. No. 4,598,585, by B. Boxenhorn, assigned to Draper Laboratory, describes a micromachined planar inertial sensor, consisting of a pair of gimbals, positioned at right angles to each other. The inner gimbal plate carries on it a substantial mass, which acts as the gyroscopic detector. The outer gimbal, noted as the y-axis in the patent, is driven by electrostatic forces (or electromagnetic forces), and is oscillating in a torsion mode, at a frequency equal to the torsional resonance frequency of the inner gimbal. Rotation of the sensor around the z axis causes the first oscillation to excite the inner resonance frequency, which is detected by a set of capacitive sensors on the inner gimbal.

The method is elegant in principle. In prior art devices, it has been suggested that the gimbals may be made out of many materials, such as silicon dioxide, nitride, oxy-nitrides, or even stamped steel or aluminum sheets. During their deposition it is very difficult to produce materials with the right stress. As a result, the frequency of the inner gimbal is not well determined and needs to be trimmed, in order to match the driving frequency. These materials are also subject to work hardening, hence the frequency of the inner resonance will change over time, causing a mismatch with the driving frequency, and an apparent loss of sensitivity.

U.S. Pat. No. 4,699,006 by B. Boxenhorn discloses a vibratory digital integrating accelerometer, based on the same technology. In this case a z axis acceleration causes a change in the resonant frequency around the y axis. The changes in frequency are representative of the z axis acceleration.

U.S. Pat. No. 5,016,072 by Paul Greiff describes further improvements on the technique. The dielectric layers of U.S. Pat. No. 4,598,585 have been replaced with a sheet of boron doped p+ silicon, and the asymmetric mass has been replaced by a symmetric one. Buckling of the oxide inner flexures causes undesirable large variations in the inner resonant frequency; special flexure footings need to be provided. Flexure grooves are needed to give controllable stiffness in the flexure. The stress in the boron doped material requires stress relief and trimming of the hinges. Electrostatic balanced force techniques are used to restrain the motion of the inner gimbal, to avoid cross-coupling and changes of its resonant frequency. The outer axis needs to be driven at the resonance frequency of the inner axis, which is done by dead reckoning, and requires frequency trimming.

U.S. Pat. No. 5,203,208 by J. Bernstein also assigned to Draper Lab, describes a symmetric micromechanical gyroscope, also using boron doped silicon. Here the resonance frequencies of both axes are designed to be the same, and trimmed to be identical. Trimming slots are also required to relieve stress in the boron doped silicon. As a result the drive voltage can be vastly reduced, which substantially helps in the elimination of parasitic pick-up signals.

Boxenhorn and Greiff in Sensors and Actuators, A21–A23 (1990) 273–277 have described an implementation of a silicon accelerometer, of the type described in U.S. Pat. No. 4,598,585, mentioned above. Here the flexures are made out of boron diffused silicon. They ascribe the difficulties encountered with this approach due to the unknown prestress, which sets the torsional stiffness and sensitivity of the device.

In all the above processes, the stresses in the hinge material are uncontrolled, and the frequencies unpredictable. An object of the invention was to devise a low-cost micromachined gyroscope having improved frequency stability and which is easy to manufacture.

SUMMARY OF INVENTION

Many of the shortcomings of prior art micromachined gyroscopes are overcome by the use of stress free single crystal silicon for the hinges of the mass elements. One way to achieve this is by using Simox material as the starting material. Single crystal silicon is an ideal hinge material, as the material has no dislocations and does not work harden, which is very important since the hinge is continuously under very high cyclical stress. The properties and resonance frequencies are predictable, no trimming slots are required. The Simox material also provides for a well controlled etch stop. Alternatively, epitaxial material, grown on a substrate of opposite doping can be used, together with electrolytic etching, as is well known in the art.

When single crystal silicon is used for the hinges, very sensitive yet inexpensive four-point piezo voltage sensors can now be incorporated to measure the torsional displacement of the hinges. The plated mass is replaced by silicon, in symmetric form if so desired. As a result the complexity and cost can be vastly reduced.

As compared to prior art designs, the preferred embodiment inverts the driven and sensing axes. This allows for better use of the silicon. The driven axis is easily brought to resonance at its natural frequency. Because the great increase in sensitivity, the second axis need not be brought to resonance, although it can be done if so desired. Because no work hardening takes place, and since very little stress is present in the silicon, the resonant frequencies are predictable and stable.

BEST MODE FOR CARRYING OUT THE INVENTION

Figure 1:
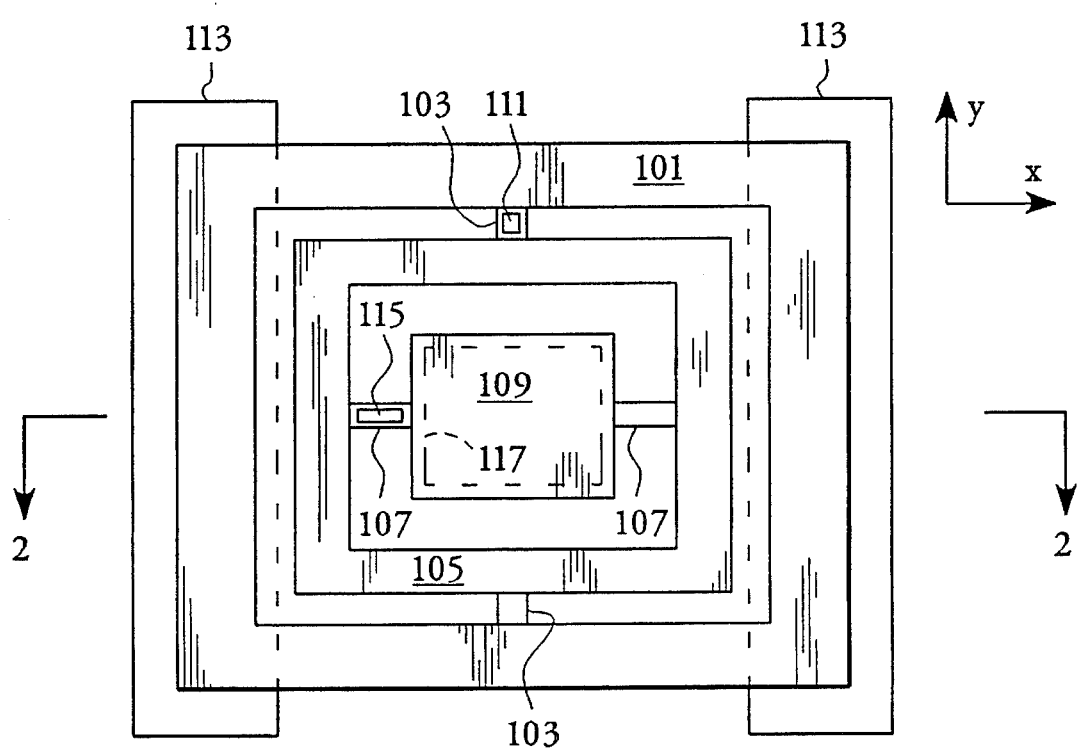
FIG. 1 is a top plan view of a micromachined device in accord with the present invention.
Figure 2:
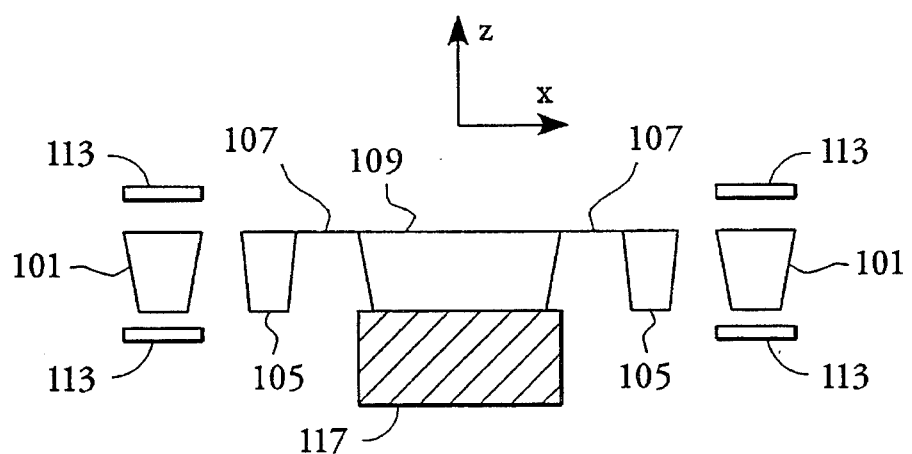
FIG. 2 is a sectional view taken along lines 2—2 in FIG. 1.

With reference to FIGS. 1 and 2, an outer silicon frame 101 oscillates around a pair of hinges (y-axis) 103, and is attached to an inner frame 105, which itself is attached to a fixed inner post 109 with a set of torsion hinges 107 (along the x-axis), at right angles to the first set of hinges. The outer frame is made to be self-oscillating, in a well controlled amplitude, and is driven by either electrostatic or magnetic forces e.g. using plates 113 which communicate electrostatic or magnetic force to the spaced apart outer frame. One or more built-in torsion sensor 111 in the silicon outer hinges provides the means for self-oscillation and amplitude stabilization.

Rotation of the system around the z axis causes the moving mass of the outer frame 101 and the inner frame 105 to oscillate at the outer frequency around the inner hinges 107 due to Coriolis forces, thereby periodically torsioning these hinges. The amplitude of the oscillation around the inner hinges, is proportional to the rate of the imposed z axis rotation. These inner hinges are also equipped with a similar four-terminal piezo torsion sensor or a capacitive sensor 115, which measures the deformation of the hinges, which is proportional to the rate of rotation of the structure. Leads for the various sensors are brought in from the fixed binding post 117; if necessary the transducer can be inverted 180 degrees and bonded directly to leads on the post.

The design allows for very good sensitivity, due to the large amplitude of the outer oscillator, its large moment of inertia for a given chip size, outstanding Si spring characteristics, and excellent sensitivity of the torsional sensor. As it turns out many of the desired orientations for anisotropic Si etching coincide with those for optimal torsion sensing. Because of the complete integration of all these parts in silicon, the device can be made very inexpensively. If necessary, the electronic drive circuits could also be integrated.

Typically, the torsional resonance around the inner hinge is chosen higher than the resonance of the outer hinge. It is possible to put the resonance frequency around the x-axis close to the resonance frequency of the outer frame around the y-axis hinges. Hence if so desired, the excursion obtained around the inner springs can be much larger than the "static" signal which would be obtained if no resonance took place. This is the feature which is used in the previous embodiments (except for the inversion of inner and outer axes); however it requires exact setting of the inner resonance frequency. The inner resonance frequency changes as the outer frame rotates around the y axis, since this causes the moment of inertia along the x axis to change. Cross coupling will take place; to avoid this, it is better to separate the resonance frequencies if the increased sensitivity is not needed.

The increase in sensitivity can be seen from the analytical expression of the rate gyro equation:

$$j\ddot{\phi} + b\dot{\phi} + k\phi = -h\psi$$

where $\phi$ is the angle of the gyro (inner axis), j the moment of inertia of the gyro, b the damping constant (if any is present) and k the spring constant of the inner hinges. $\psi$ is the rate of rotation around the z axis, h is the spin momentum, given by the product of $I\omega$ where I is the moment of inertia and $\omega$ the angular frequency of the oscillating body. For a rotating gyro, $\omega = d\Theta/dt$ is often constant, but for a vibratory gyro, $\Theta$ is a sinusoidal function of time, and therefore so is the spin momentum. If $\Theta = \Theta_0 \sin \omega t$ then $h = I\Theta_0 \omega \cos \omega t$. Neglecting transient effects and resonance conditions, the steady state solution for the angle is given by:

$$\phi = \frac{-I\omega\Theta_0 \cos\omega t \, \psi}{-\omega^2 j + j\omega b + k}$$

The larger I, $\omega$ and $\Theta_0$, and the smaller the spring constant k of the inner hinges, the larger the resulting deflection angle is bound to be. If we set the rate of rotation equal to unity, then we can look upon the above expression as a figure of merit for the overall design. Since the torsion sensors are really strain (or stress sensors) the quantity to be optimized is maximum strain, which is slightly different, but not much so, from the deflection. For a given die size of silicon it is found that the largest figure of merit is obtained by increasing I and $\Theta_0$, the amplitude of oscillation. Increasing I usually lowers $\omega$, but this decrease is vastly offset by the increase in I. It is for this reason that putting the oscillating mass on the outside provides for improved use of the silicon real estate. The spring constant k cannot be arbitrarily lowered to increase sensitivity, since the inner hinges must be capable of supporting all the mass with a large safety factor for shock.

A typical design may have an outer square frame 101 dimension of 5 mm, a wafer thickness of 500 microns, 800 micron widths for frames 101 and 105, outer hinges 103 being 200 microns long, 80 microns wide, 10 microns thick, inner hinges 107 of equal thickness, 175 microns long and 100 microns wide, and a square inner post 1.4 mm on a side. This design gives a resonance frequency of about 133 Hz around the outer hinges, and 150 Hz around the inner hinges. The calculated figure of merit is 0.001 which means that a rotation rate of 1 rad/sec gives a deflection angle of 0.06 degrees, which is quite a large angle. A small fraction of this angle can be readily detected by the torsion sensor.

Figure 3:
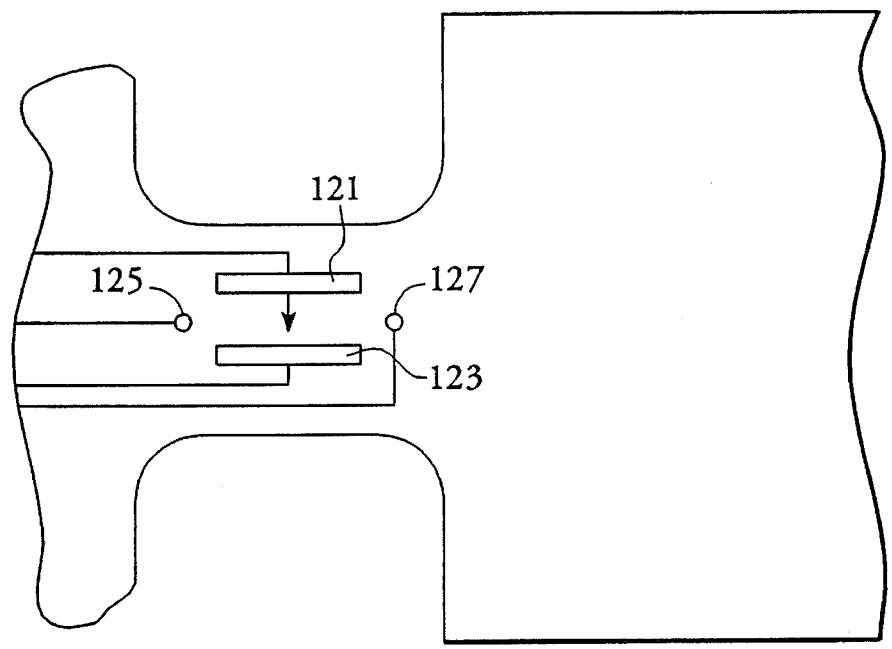
FIG. 3 is an enlargement of a torsional hinge of the device of FIG. 1, showing a torsion transducer.

The preferred torsion sensor (111, 115) is of the four terminal type as illustrated in FIG. 3 and similar to the type described by Pfann et al., but optimized here for a hinge. See "Semiconducting Stress Transducers utilizing the Transverse and Shear Piezo Resistance Effects", W. G. Pfann and R. N. Thurston, Journ. Appl. Phys., Vol. 32, 10, pg. 2008, 1961. Current is passed through terminals 121 and 123 perpendicular to the flexure hinge length, and the output voltage is measured between terminals 125 and 127.

Torsion of the hinge gives rise to a change in the voltage between points 125 and 127. For torsion of the hinge, the stresses present are pure shear stresses, oriented parallel to the indicated current direction. The field generated in the perpendicular direction is given by the expression:

$$E = i\rho\sigma\pi$$

where E is the field, ρ the nominal resistivity of the material, i the current density, σ the shear stress, and π the relevant element of the piezoresistive tensor in the particular direction.

By orienting the sensor as illustrated, with the current perpendicular to the length of the hinge, the current section can be made as long as is desirable, and the generated voltage, which is the integral of the field, should increase linearly with the length of the current section. In principle the generated voltage could exceed the applied voltage at the current terminal, but in practice because of shorting due to the current electrodes, the generated voltage never gets that high. In this preferred arrangement, the geometry of the sensor matches perfectly the geometry of the hinge.

Figure 4:
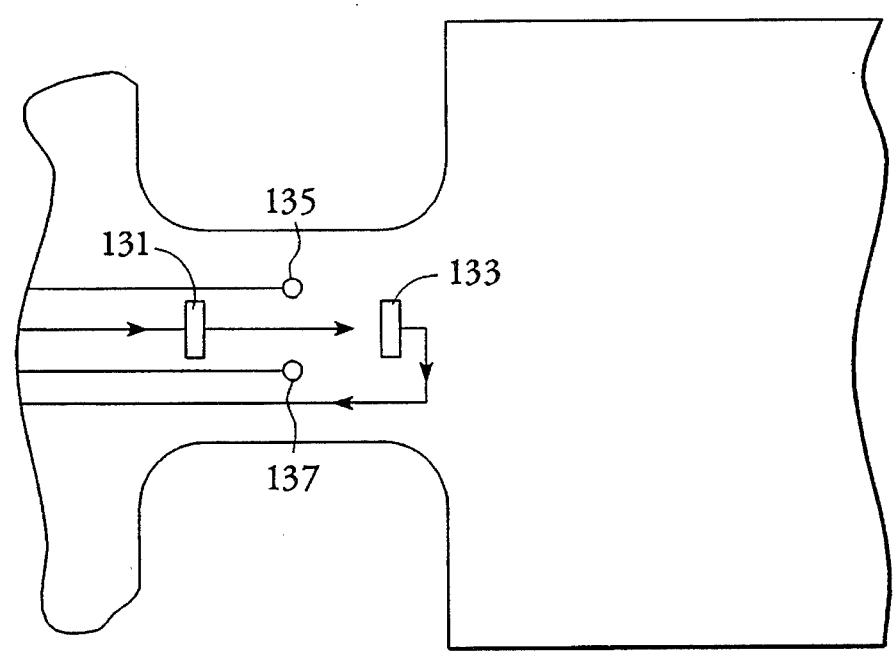
FIG. 4 illustrates an alternate embodiment of the torsion transducer shown in FIG. 3.

Another orientation is illustrated in FIG. 4. Here the current is parallel to the hinge length from 131 to 133, and the voltage is picked up perpendicular to the hinge length between terminals 135 and 137. The field generated is given by the same expression, but the current width is now restricted to the width of the hinge. The only way to increase the voltage here, is to increase the applied voltage at the current leads. Note also that the first orientation of the torsion sensor is also advantageous for another reason: the current supply lines are usually quite broad, and they leave little room to bring out the voltage sensing lines, if they are oriented as in FIG. 4. If the hinge is under considerable shear stress, then it is advantageous to put the current carrying lines at the edge of the hinge, where the shear stress is zero, as this reduces metal fatigue.

Silicon, in the right orientation, is extremely sensitive to shear, more so than to any other stress. For a (100) orientation of the Si wafer surface, which is the preferred orientation for most micromachining, the highest shear sensitivities are obtained with the torsion bar in the (100) direction for p type silicon, and in the (110) direction for n type silicon. The piezo-resistance coefficients are almost independent of doping, until the resistivity reaches a value on the order of 0.01 ohm-cm. Note that the output of this torsion sensor is independent of any linear stresses or bending of the hinge. Instead of 4 contact points, (2 for current, 2 for voltage), the number can be reduced to 3, using one current injection and two symmetrically placed current pickup points.

The described piezo voltage is a bulk effect; however in many hinges of interest, the thickness of the hinge is much less than the width of the hinge. Since the shear stress reverses sign on the other face of the hinge, the generated voltages also reverse sign. The effects would then tend to cancel each other if the current were uniform throughout the thickness of the hinge. Therefore the applied current must be restricted to one half of the hinge, where the shear stress has always the same sign. In practice it is best to restrict the current to the top few microns of the hinge, as the stress is largest there, and to reduce the power dissipation. This can be done by preferentially heavy doping of the top few microns (n-type in n-type material), or by junction isolation (e.g., making an n type well in a p type substrate). The latter technique has the advantage that the sensor is electrically no longer part of the hinge and the associated structures, but is now junction isolated and therefore much less sensitive to the driving voltage pickup.

To avoid DC offsets etc. and interfering noise at the driving voltages, the applied current to the torsion sensor can be AC, usually at a frequency higher than any of the resonant frequencies. The torsion then produces an amplitude modulation of the pickup voltage at the driving frequency, which can be readily demodulated, giving the desired signal. The output of the torsion sensor can be used in a positive feedback scheme to resonate the oscillator at its resonant frequency, or used as a measure of the deflection of the hinge, or both.

Figure 5:
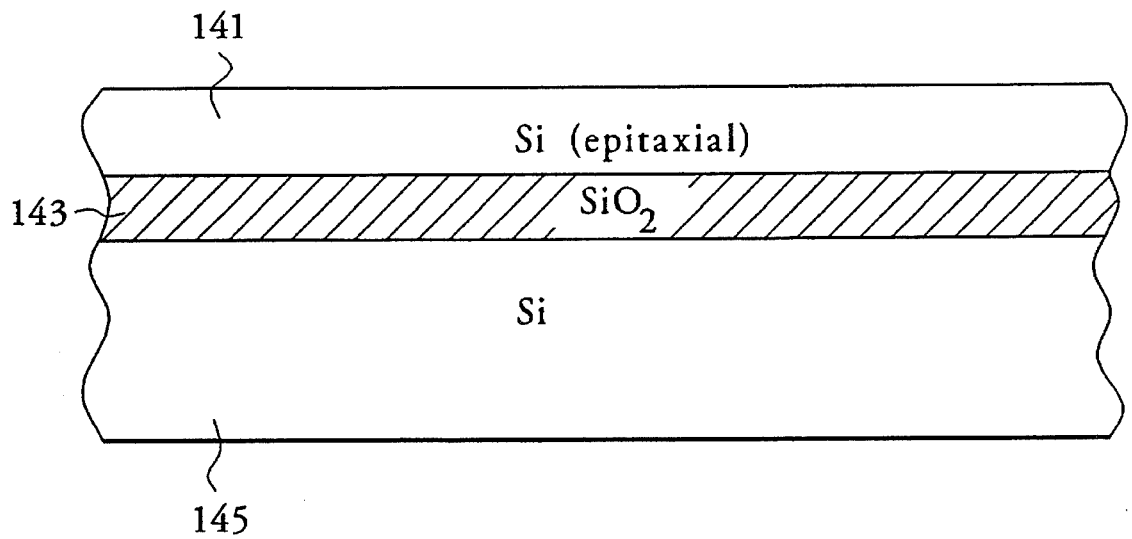
FIG. 5 is a partial cutaway plan view of a Simox wafer for fabricating devices of the present invention.

For the fabrication, Simox wafers are preferred, although in principle any other silicon on insulator wafer, with a similar structure can be used. Epitaxially grown silicon, of a different type as its underlying substrate can also be used together with electrolytic etching. What is required is a layer of high quality, stress free silicon separated from the bulk by a suitable etch stop. When the hinges are made out of this Simox material, they are virtually stress free, and of very high quality. Simox wafers of the type shown in FIG. 5 consist of an epitaxial single crystal silicon layer 141, from a fraction of a micron to tens of microns thick, grown on top of an oxide layer 143. Underneath the top Si layer 141 is a silicon dioxide layer 143, typically several thousands of Angstroms thick, and which itself sits on top of the bulk of the silicon wafer 145. Other silicon on insulator structures can be used, equivalent in topography to Simox, but using different methods to produce the structure.

When this wafer is used with orientation dependent etching such as KOH or EDA, the oxide provides for a very good, well controlled and clean etch stop. Since the epi deposition gives rise to a uniform thickness layer, the thickness of the hinges, determined by the thickness of the epi, are very uniform in size all over the wafer. This property gives rise to a very uniform hinge thickness, which is critical to obtain a uniform resonance frequency of all the devices on the wafer.

Typically the wafer is etched from the back, defining the various cavities and masses, as is well known in the art, using the appropriate anisotropic etchant. For example, in FIGS. 1 and 2, frames 101, 105 and post 109 are etched from the silicon wafer. Edge compensation can be used to protect the convex corners of the frames, if any are present. Etching of the corners is not critical, provided that all corners are etched symmetrically to preserve the symmetry of the mass. After completion of the bottom etch which goes through the bulk of the wafer, the epitaxial silicon is etched from the front, which defines the hinges and the outline of the plate. This can be done with an RIE chlorine etch or again using an anisotropic etch. The oxide is then removed, leaving the mass and the hinges free-standing. Hinges 107 in FIGS. 1 and 2 are an example. The oscillating frame can be either the full thickness of the starting wafer, or alternatively, the thickness of the epi layer. The etching procedure steps may be reversed if so desired. No mass needs to be plated here; it is provided by the silicon itself, and can be very substantial.

Ohmic contacts for the torsion sensor on the hinge can be lithographically defined, deposited and annealed in place as is well known in the state of the art using for example gold. The gold readily withstands the etchants used. The contacts for the sensor are made before any deep lithography steps are done, since otherwise the patterning becomes very difficult.

As outlined in FIG. 1, the device illustrated suffers from some cross-pendulosity. That is, the center of mass of the oscillator, and its rotation axis do not coincide. During the torsion oscillation, the centrifugal forces created produce an excitation at double the frequency of oscillation and may excite the vertical shaking mode of the oscillator. For that reason the mode spectrum of the oscillator should be as clean as possible. The torsional resonance mode should be the lowest in the mode spectrum, and separated as much as possible from any of the higher modes by at least 20% of the lower resonance frequency. Generally this is easier to do if the resonance frequency is low.

Figure 6:
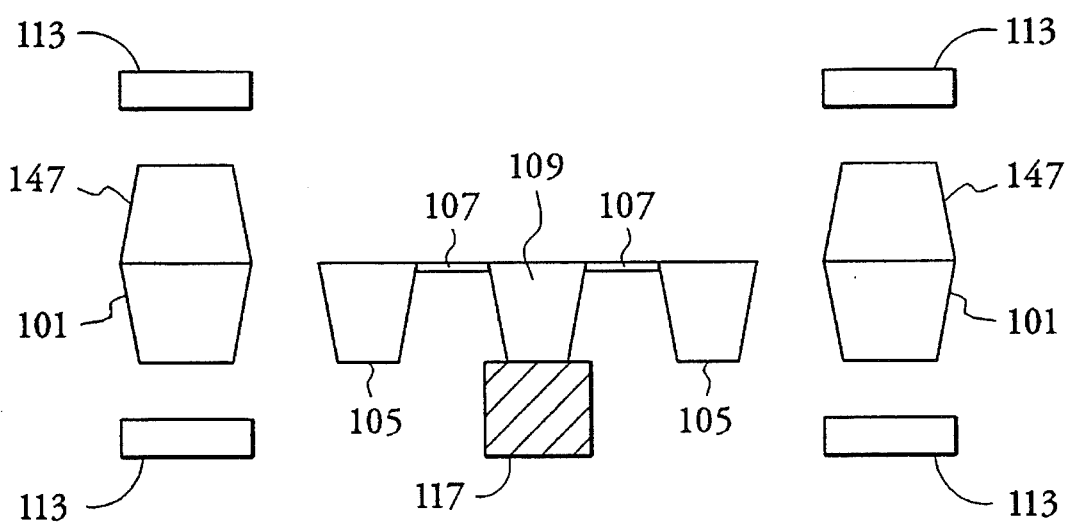
FIG. 6 is a side view of a plan for fabricating symmetric devices with the present invention by means of wafer bonding.

For the best performance, it is however possible to construct a symmetric oscillator using two wafers of the same thickness. In FIG. 6 one processed Simox wafer 101 and a regular wafer 147 are bonded together, with their crystal orientations aligned. The Simox wafer is processed in the usual way, first forming the hinge pattern in the epitaxial layer and the joined lower frame portions in the main wafer body, i.e. those portions of the frame which are on the same plane as the hinges and below. The wafer is then etched to remove excess material. The second wafer is then bonded to the Simox wafer. A pattern corresponding to the upper portion of the frame, i.e. above the plane of the hinges, is masked and excess wafer material is etched away. Two Simox wafers could be used, but this is not necessary. This can be done in a variety of ways as is known in the state of the art. By choosing wafers of the same thickness, an essentially symmetric structure can be obtained. The entire structure can be mounted in a vacuum enclosure. The inner walls of the enclosure can be used to support the driving electrodes which are spaced from frame members.

It is highly desirable that the torsion oscillator be self-starting and self-oscillating, that is selecting its own natural resonance frequency rather than having an externally imposed frequency. This is accomplished by using a torsion sensor 111 of the above type in one of the y axis hinges 103. Its output, demodulated if necessary, is then sufficiently amplified and fed back with the right phase to the driving mechanism, either electrostatic or electromagnetic, to create enough positive feedback to sustain oscillation at a controlled amplitude. Alternatively, the resonance condition of the outer oscillator can be sensed by observing the linear strains in the inner torsion hinges. The rotation of the outer frame produces by reaction a periodic flexing of the inner hinges, which generates compressive and tensile stresses in them. These can be picked up by common two terminal piezoresistive elements. If the inner torsion hinges are oriented in the 110 direction, then n type material is not very sensitive to longitudinal stresses, although usable, while p type is. The best material for such dual use is p type material, oriented in the 110 direction. An n-type well in this material will provide optimum sensing of torsion, while the p type material is optimum for tensile stresses. For a similar reason as above, the stress sensing is usually restricted to the top few micron. The torsion sensors are not sensitive to compressive and tensile stresses.

Figure 7A:
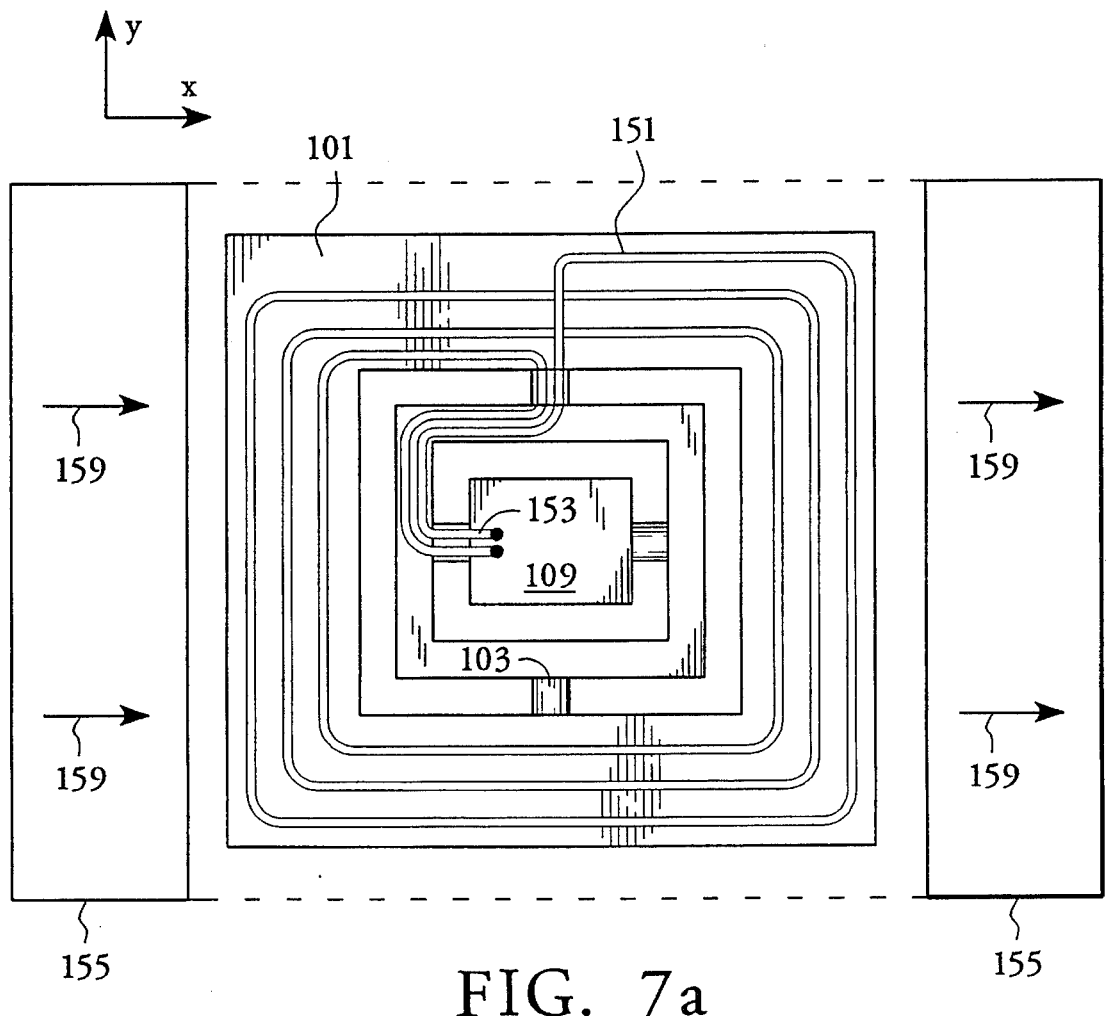
FIGS. 7a and 7b illustrate magnetic drive structures for the device of the present invention.
Figure 7B:
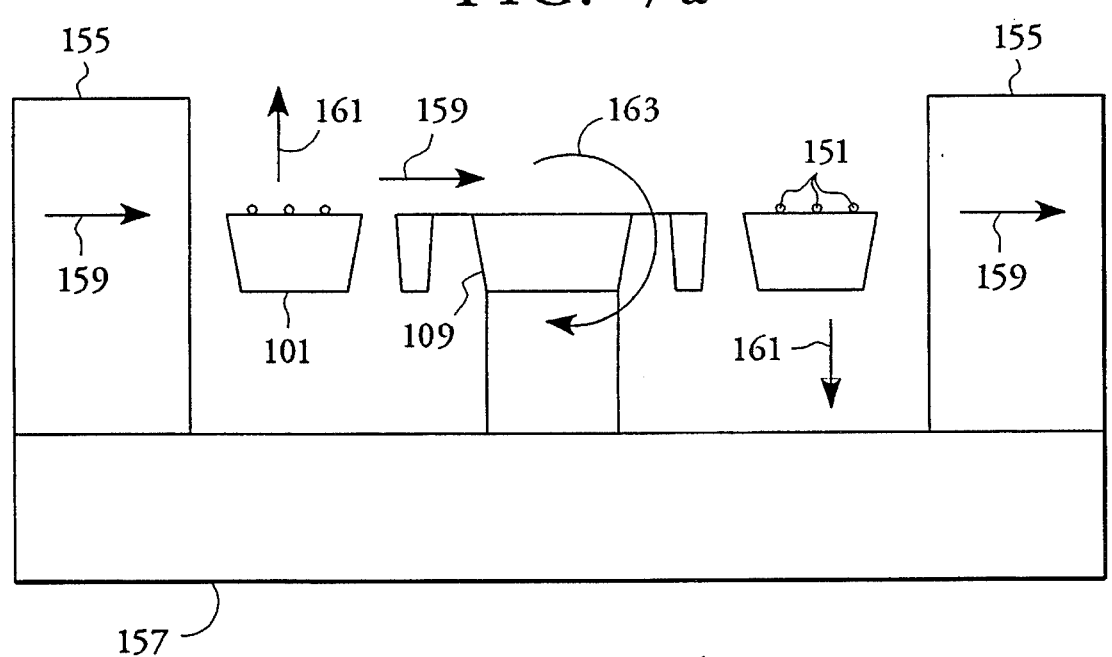

The excitation of the outer oscillator should be done as symmetrically as possible, with a pull-pull arrangement 113 if done electrostatically as illustrated in FIG. 1. To this end magnetic excitation can also be used. This is schematically illustrated in FIGS. 7a and 7b. A coil 151 is deposited on the outer frame 101, but isolated by a thin layer of dielectric to avoid shorting, and current is passed through leads 153. Small permanent magnets 155 and a magnetic keeper 157, provide a magnetic structure, creating a B field 159. The interaction between the current and the field causes forces 161 on the coil 151, giving rise to a torque 163, around the hinges 103. Because the structure is rather small, relatively large magnetic fields can be produced with inexpensive magnets. The coil 151 is plated on the outer frame and returns through one hinge. This drive method requires no high voltages as is needed for the electrostatic drive, which not only makes the drive, but the pick-up of the small torsion signals more easy. The magnetic fields 159 should be symmetric, including the fringing fields in the x direction. If not, the current interaction with this transverse field will produce torque around the x-axis.

The electrostatic voltages needed for driving can be greatly reduced, if the gyro is operated in vacuum. Because the Q has been observed to be close to 1 million, the driving voltages can be readily reduced to about a volt. Because the driving forces are then negligible, as compared to the inertia of the rotating mass, symmetry of the drive becomes unimportant. The mode spectrum also tends to be purer in vacuum. Inexpensive vacuum enclosures can be made through micromachining and wafer bonding techniques.

The detection scheme on the inner axis can be operated two ways: either as a straight sensor or as a force feedback scheme. The latter is well known to be in principle preferable as it reduces the cross coupling, but requires more complex electronics. As the device is plenty sensitive, the same benefit can be accomplished to some degree by stiffening the inner hinges and reducing the excursion; this reduces the cross-coupling effects. Force feedback can be accomplished using either magnetic or electrostatic forces. The first one may be desirable, but can only be used if electrostatic forces are used for the driving, because crossed magnetic fields cause interaction.

Figure 8A:
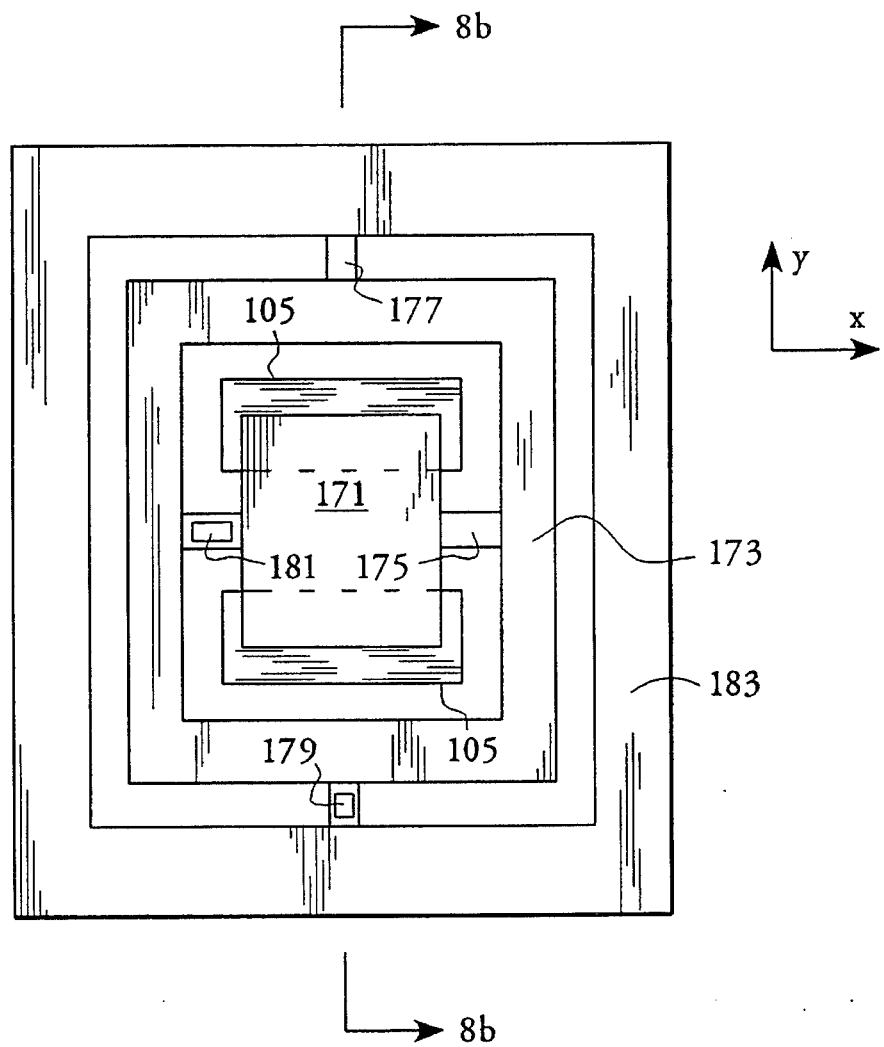
FIGS. 8a and 8b illustrate an alternate drive configuration with driven and sensing axes inverted.
Figure 8B:
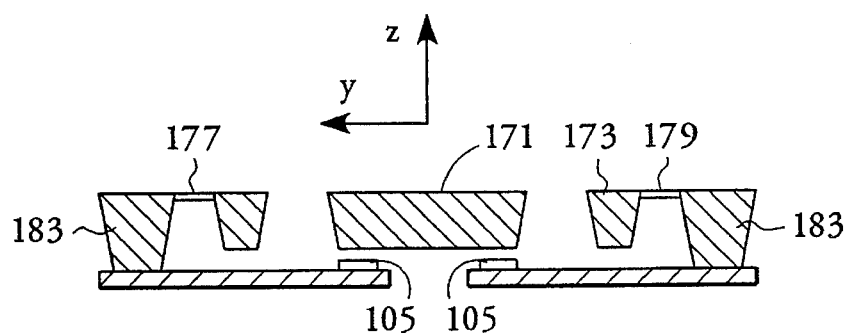

The preferred mode has been described as one where the inner mass 109 is fixed, and the outer frame 101 moving. As shown in FIGS. 8a and 8b, it is also possible to position the substantive mass 171 on the inner frame 173, oscillate the mass around the inner x axis hinge 175 in a controlled amplitude, with a positive feedback, and detect tilts on the outer y axis hinge 177, using sensor 179 and either force feedback or regular sensing mode. Driving the inner axis 175 (either electrically with plates or magnetically), using the torsion sensor 181 allows the mass 171 to be driven at its own resonance frequency, with a well controlled amplitude. This is less efficient in terms of the factor of merit than the first mode, but it makes the lead contact problem somewhat easier. Resonance frequencies around both axes can be selected to be coincident, to increase the sensitivity of the system, but subject to the above mentioned limitations.

Alternatively, both the configuration of U.S. Pat. Nos. 4,598,858 and 5,016,092 can be executed using the Simox silicon hinge and mass material and the described torsion sensors instead of the capacitive pickups. In this mode the substantive mass is put at the inner x-axis gimbal, and is driven, magnetically or electrostatically, around the outer axis, nominally at the resonance frequency of the inner axis. Excitation of the inner axis resonance occurs when the sensor rotates around the z axis. As is the case in these patents, the x-axis is normally not excited, and therefore cannot be used for setting the frequency of the y drive. Dead reckoning must be used. Any drift between the driving frequency and the resonance frequency causes an apparent loss of sensitivity. However, many of the problems encountered are overcome by the use of the stress free silicon material, which also has no work hardening. Stabilization of the oscillation amplitude around the y axis, driving it at resonance and pickup around the x axis is again most cost effectively done with four-point piezosensors, and the hinges should be made out of single crystal silicon.

Figure 9A:
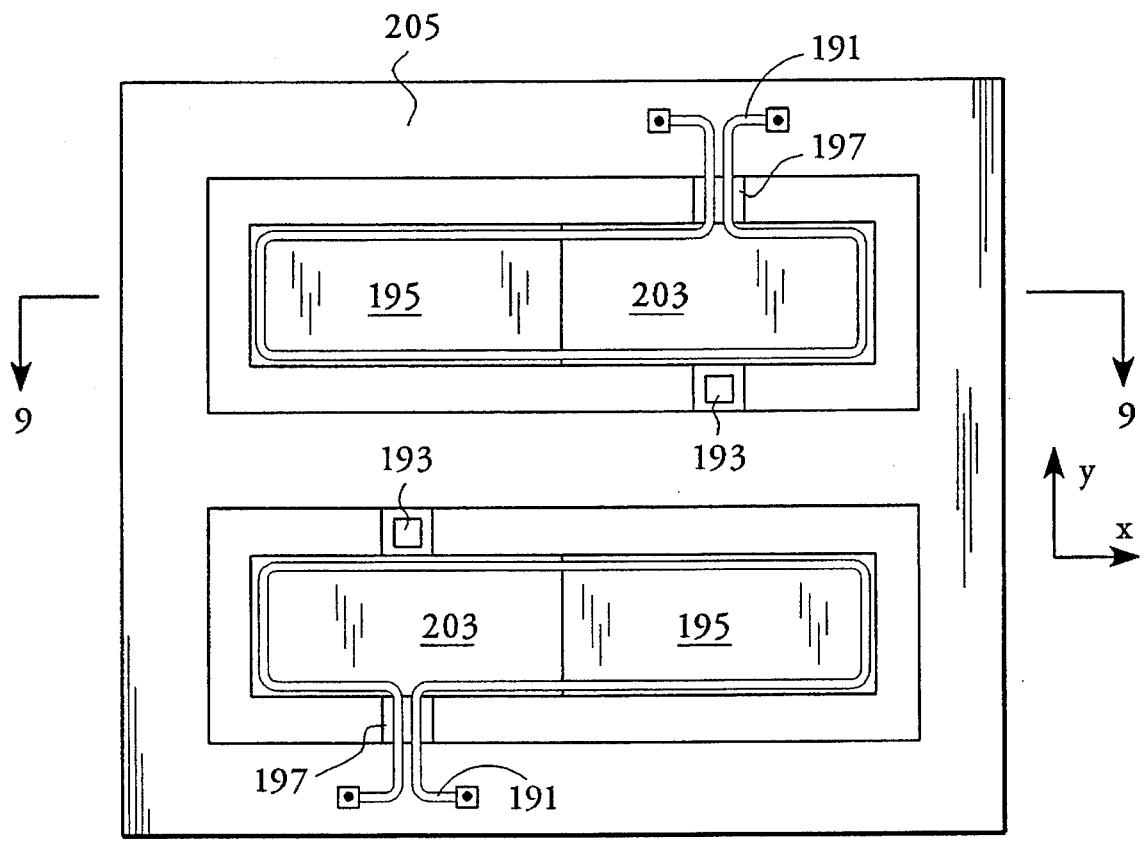
FIGS. 9a and 9b illustrate torsion accelerometer devices in accordance with the present invention.
Figure 9B:
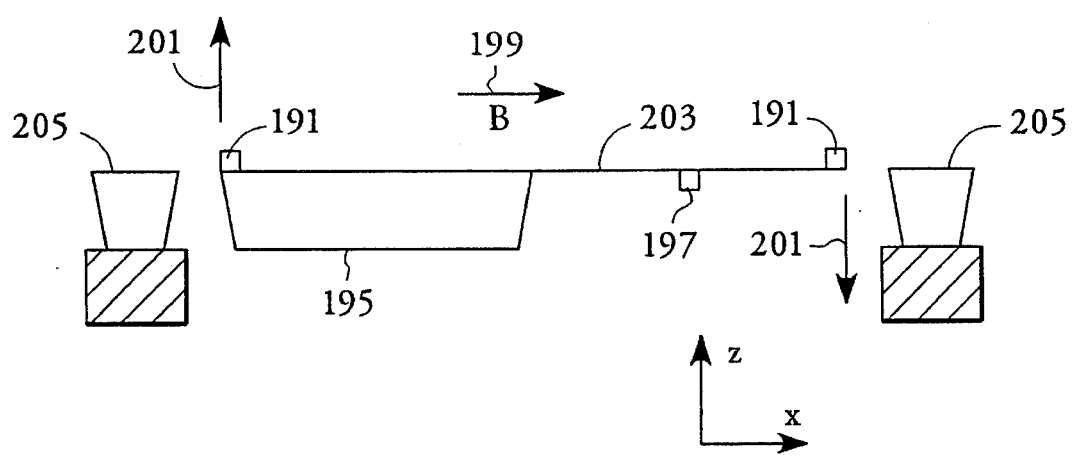

It is also possible to apply these hinge technologies for production of accelerometers of the type first proposed by Boxenhorn in U.S. Pat. No. 4,598,585. We propose that the hinges be made out of the single crystal material as described, and that the sensor be of the four-terminal piezo voltage type as described. A preferred embodiment is illustrated in FIG. 9, using a current loop as the actuator and sensor 193 for the feed-back system. B field 199 is created by an external structure as above; interaction with current loop 191 causes forces 201, producing torque around hinge 197, which itself connects plate 203, carrying eccentric mass 195, to frame 205. This produces a force feedback accelerometer of very simple and inexpensive design and linear output. The unbalanced mass 195 is created here by etching. The weight, hinge and magnetic field are all uncritical; a simple calibration can be done by holding the accelerometer flat and then inverting it; this produces a 2 g acceleration. The current which is necessary to keep the unbalanced mass in place, as measured by a zero output signal from the torsion sensor 193, is a measure of the acceleration which the sensor is subjected to.

As drawn, the signal from the accelerometer is in principle derived from an acceleration in the z axis, but acceleration in the x-axis also gives a small, undesirable output signal, as the center of mass is not in the plane of the hinges. By using two identical devices as illustrated, in FIG. 8 and putting their output in opposition, it becomes possible to eliminate the spurious effects of cross-accelerations, while at the same time doubling the output signal. The same current source can in principle be used to drive both sensors, but the voltages of the sensor outputs can only be added after removal of the common mode signal. The mass unbalance can be created by making one arm longer than the other, or by removing the mass completely from one arm. The latter may be more advantageous, as it is lighter, and produces less stress on the hinges when high g forces arise. The output signal is the current needed to keep the hinge 113 undeflected, and is linearly related to the z axis acceleration. A substantial symmetric mass can also be obtained by wafer bonding, as defined above.

The device can also be made by using an electrostatic field to keep the plate in place, as is common for most feedback accelerometers. However, in order to avoid large voltages, the plate needs to be very close, which makes the design difficult. The magnetic approach does not suffer from this difficulty; also the homogeneity of the magnetic field is of no concern, since the hinge never tilts, as restricted by the servo loop. Usually a single current loop, one turn coil 191, is adequate to provide the necessary restoring force, so that no overlap of the coil winding is necessary. Force (or torque) feedback accelerometers have generally superior performance as compared to other devices, especially for low frequencies, but their cost is generally quite high. The proposed system is a low cost version, which preserves most of the performance characteristics, while drastically lowering cost. For the device as illustrated in FIG. 9, with a 2 mm eccentric mass, 500 microns thick, 2 mm wide, and silicon hinges 10 microns thick, 70 microns wide and 400 microns long, the resonance frequency is on the order of 180 Hz, and with a 1000 Gauss external magnetic field, the current for 0.1 g acceleration is 10 mA, for a single turn loop, a readily measured value. The torsion sensor 193 is again of the four-terminal piezo voltage type; its output is now maintained at zero by the feedback loop.

We claim:

1. A vibratory gyroscopic silicon transducer, comprising, a silicon micromachined inner post, having a top surface defining an x-y plane, a first silicon frame, surrounding the post, a first set of single crystal silicon hinges connected between the first silicon frame and the inner post, with the hinges defining a first axis, a second silicon frame, surrounding the post and the first frame, the second silicon frame having a natural resonant frequency, a second set of single crystal silicon hinges connected between the first and second silicon frames, defining a second axis at right angles to the first axis, the second frame defining a vibratory mass, at least one four-terminal piezo voltage sensors, incorporated into at least one of said first set and at least one of said second set of hinges, each of said piezo sensors having at least two spaced apart current electrodes on the surface of the hinges making ohmic contact to an adjacent layer of silicon with an area of the silicon between the current electrodes defining a resistive element, said electrodes positioned to transmit current through said resistive element along a vector, the sensors also having at least two spaced apart voltage sensing electrodes disposed along a line generally perpendicular to said vector, means for measuring a voltage between said two spaced apart voltage sensing electrodes, means for increasing a density of a current flow in the resistive element so that the current flow density is at least doubled, whereby shear forces present in each of the first and second set of hinges alter a resistivity of the resistive element generating a voltage indicating torsion force, and drive means to make the second silicon frame oscillate at the natural resonant frequency around the second axis at a constant amplitude, with a piezo sensor attached to a hinge of the second set of hinges providing positive feedback to control a frequency at which the second silicon frame oscillates.

2. The apparatus of claim 1 wherein said inner post is fixed and said current electrodes are elongated, having a length generally perpendicular to the axis of said first and second set of hinges.

3. The apparatus of claim 1 wherein said current electrodes are elongated, having a length generally parallel to the axis of said first and second set of hinges.

4. The apparatus of claim 1 further defined by electrical leads connected to said electrodes and insulated from said silicon.

5. The apparatus of claim 4 wherein said axis of said first and second set of hinges is aligned in either the <100> direction or the <110> direction of silicon.

6. The apparatus of claim 5 wherein said means for increasing the density of current flow comprises a junction isolation region.

7. The apparatus of claim 5 wherein each hinge of said first and second set of hinges includes piezo resistive means for measuring longitudinal and bending stresses.

8. A vibratory gyroscopic silicon transducer, comprising, a fixed silicon micromachined inner post, having top surface defining an x-y plane, a first silicon frame, surrounding the post, a first set of single crystal silicon hinges connected between the first silicon frame and the inner post, the hinges defining a first axis, with the first silicon frame attached thereto for movement about the first axis, a second silicon frame, surrounding both the post and the first frame, the second silicon frame having a natural resonant frequency, a second set of single crystal silicon hinges connected between the first and second silicon frames, defining a second axis at right angles to the first axis, the second frame attached thereto for movement about the second axis, defining a vibratory mass, at least one four-terminal piezo voltage sensors, incorporated into at least one of said first set and at least one of said second set of hinges, each of said piezo voltage sensors including a resistive element defined by a nominal resistivity of the crystal silicon hinges to sense torsion in said hinges in which the piezo sensors are incorporated, drive means to make the second silicon frame oscillate at the natural resonant frequency around the second axis at a constant amplitude, with at least one of said piezo sensors attached to a hinge of the second set of hinges providing positive feedback to control a frequency at which the second silicon frame oscillates.

9. The apparatus of claim 8 wherein said drive means is electrostatic.

10. The apparatus of claim 8 wherein said drive means is magnetic.

* * * * *